US011615512B2

(12) United States Patent
Neofytou et al.

(10) Patent No.: US 11,615,512 B2
(45) Date of Patent: Mar. 28, 2023

(54) RELIGHTING SYSTEM FOR SINGLE IMAGES

(71) Applicant: Microsoft Technology Licensing, LLC, Redmond, WA (US)

(72) Inventors: Alexandros Neofytou, London (GB); Eric Chris Wolfgang Sommerlade, Oxford (GB); Sunando Sengupta, Reading (GB); Yang Liu, Reading (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 17/189,478

(22) Filed: Mar. 2, 2021

(65) Prior Publication Data
US 2022/0284551 A1  Sep. 8, 2022

(51) Int. Cl.
*G06T 5/00* (2006.01)
*G06K 9/62* (2022.01)
*G06N 3/08* (2023.01)

(52) U.S. Cl.
CPC ............ *G06T 5/005* (2013.01); *G06K 9/6256* (2013.01); *G06N 3/08* (2013.01); *G06T 2207/20081* (2013.01); *G06T 2207/20084* (2013.01)

(58) Field of Classification Search
CPC . G06T 2207/20084; G06T 2207/20081; G06T 7/11; G06T 11/001; G06T 11/60; G06T 11/00; G06T 2207/20224; G06T 2207/30088; G06T 2207/30096; G06T 3/4046; G06T 3/4053; G06T 7/0002; G06T 7/0004; G06T 7/0014; G06T 7/97; G06T 1/0007; G06T 15/00; G06T 15/10; G06T 17/05; G06T 17/20; G06T 2200/24;
(Continued)

(56) References Cited

U.S. PATENT DOCUMENTS 10,949,715 B1 *  3/2021  Berlin .................... G06T 1/20
2018/0121626 A1 *  5/2018  Abedini ................ G16H 50/30

OTHER PUBLICATIONS

Br, et al., "Monocular Reconstruction of Neural Face Reflectance Fields", In Repository of arXiv:2008.10247v1, Aug. 24, 2020, 10 Pages.
(Continued)

*Primary Examiner* — Ajibola A Akinyemi

(57) ABSTRACT

In various embodiments, a computer-implemented method of training a neural network for relighting an image is described. A first training set that includes source images and a target illumination embedding is generated, the source images having respective illuminated subjects. A second training set that includes augmented images and the target illumination embedding is generated, where the augmented images corresponding to the source images. A first autoencoder is trained using the first training set to generate a first output set that includes estimated source illumination embeddings and first reconstructed images that correspond to the source images, the reconstructed images having respective subjects that are i) from the corresponding source image, and ii) illuminated based on the target illumination embedding. A second autoencoder is trained using the second training set to generate a second output set that includes estimated augmented illumination embeddings and second reconstructed images that correspond to the augmented images.

16 Claims, 12 Drawing Sheets

(58) Field of Classification Search
CPC . G06T 2207/10081; G06T 2207/20221; G06T 2207/30004; G06T 2219/2004; G06T 3/0006; G06T 3/0012; G06T 3/4007; G06T 7/12; G06T 7/136; G06T 7/194; G06K 9/6262; G06K 9/6256

USPC ........................................................ 382/159

See application file for complete search history.

(56) References Cited

OTHER PUBLICATIONS

"International Search Report and Written Opinion Issued in PCT Application No. PCT/US22/017181", dated Jun. 15, 2022, 13 Pages.

Yu, et al., "Self-supervised Outdoor Scene Relighting", In Proceedings of 16th European Conference on Computer Vision, Aug. 23, 2020, pp. 84-101.

Abu-El-Haija et al., "Youtube-8m: A large-scale video classification benchmark", In Journal of Computing Research Repository, Sep. 2016, 10 Pages.

Barron, et al., "Shape, Illumination, and Reflectance from Shading", In Proceedings of IEEE Transactions on Pattern Analysis and Machine Intelligence vol. 37, Issue: 8, Aug. 1, 2015, pp. 1670-1687.

Bertinetto, et al., "Fully-convolutional siamese networks for object tracking", In Proceedings of 14th ECCV Workshops on Computer Vision, Oct. 8, 2016, pp. 1-16.

Bromley, et al., "Signature verification using a "Siamese" time delay neural network", In Advances in neural information processing systems, 1994, pp. 737-744.

Chen, et al., "Single-image depth perception in the wild", In Advances in neural information processing systems, Dec. 5, 2016, pp. 1-9.

Choi, et al., "Structured set matching networks for one-shot part labeling", In Proceedings of IEEE Conference on Computer Vision and Pattern Recognition, Jun. 18, 2018, pp. 3627-3636.

Debevec, Paul, "Rendering Synthetic Objects into Real Scenes: Bridging Traditional and Image-based Graphics with Global Illumination and High Dynamic Range Photography", Proceedings of the 25th annual conference on Computer graphics and interactive techniques, Jul. 1998, pp. 189-198.

Dherse, et al., "Scene relighting with illumination estimation in the latent space on an encoder-decoder scheme", In Repository of arXiv:2006.02333v1, Jun. 3, 2020, pp. 1-30.

Duchêne, et al., "Multiview intrinsic images of outdoors scenes with an application to relighting", In ACM Transactions on Graphics, Oct. 2015, 16 Pages.

Goodfellow, Ianj. , "Generative adversarial nets", In Advances in neural information processing systems, Jan. 1, 2014, pp. 1-9.

Isola, et al., "Image-to-image translation with conditional adversarial networks", In Proceedings of the IEEE conference on computer vision and pattern recognition, Jul. 21, 2017, pp. 1125-1134.

Koch, et al., "Siamese neural networks for one-shot image recognition", In ICML deep learning workshop, vol. 2., Jul. 10, 2015, 30 Pages.

Kowalski, et al., "Config: Controllable neural face image generation", In Repository of arXiv:2005.02671v3, Oct. 19, 2020, pp. 1-28.

Li, et al., "A closed form solution to photorealistic image stylization", In Proceedings of the European Conference on Computer Vision(ECCV), 2018, pp. 1-16.

Li, et al., "Learning linear transformations for fast image and video style transfer", In Proceedings of the IEEE conference on computer vision and pattern recognition, 2019, pp. 3809-3817.

Li, et al., "Siamrpn++: Evolution of Siamese visual tracking with very deep networks", In IEEE Conference on Computer Vision and Pattern Recognition, 2019, pp. 4282-4291.

Liu, et al., "Large-scale CelebFaces Attributes (CelebA) Dataset", In Journal of Retrieved August, vol. 15, Sep. 2018, 6 Pages.

Luan, et al., "Deep photo style transfer", In Proceedings of the IEEE Conference on Computer Vision and Pattern Recognition, Jul. 21, 2017, pp. 6997-7005.

Philip, et al., "Multi-view relighting using a geometry-aware network", In Journal of ACM Transactions on Graphics (TOG), vol. 38, Issue 4, Jul. 2019, 14 Pages.

Sengupta, et al., "Sfsnet: Learning shape, reflectance and illuminance of faces in the wild", In Proceedings of the IEEE Conference on Computer Vision and Pattern Recognition, Jun. 18, 2018, pp. 1-10.

Shih, et al., "Style transfer for headshot portraits", In Association for Computing Machinery, Jul. 2014, 15 Pages.

Shu, et al., "Neural face editing with intrinsic image disentangling", In Proceedings of the IEEE conference on computer vision and pattern recognition, Jul. 21, 2017, pp. 5444-5453.

Shu, et al., "Portrait lighting transfer using a mass transport approach", In Journal of ACM Transactions on Graphics, vol. 36, Issue 4, Oct. 2017, 15 Pages.

Sun, et al., "Single Image Portrait Relighting", In Journal of ACM Transaction Graph, vol. 38, Issue 4, Jul. 12, 2019, 12 Pages.

Wang, et al., "Image quality assessment: From error visibility to structural similarity", IEEE Transactions in Image Processing 13, Apr. 2004, pp. 600-612.

Whelan, et al., "Elasticfusion: Real-time dense slam and light source estimation", In the International Journal of Robotics Research, Sep. 29, 2016, 23 Pages.

Worrall, et al., "Interpretable transformations with encoder-decoder networks ", In Proceedings of the IEEE International Conference on Computer Vision, Oct. 22, 2017, pp. 5726-5735.

Zhang, et al., "Emptying, refurnishing, and relighting indoor spaces", In Journal of ACM Transactions on Graphics (TOG), vol. 35, Issue 6, Dec. 5, 2016, 14 Pages.

Zhou, et al., "Deep single-image portrait relighting", In Proceedings of the IEEE International Conference on Computer Vision, Oct. 2019, pp. 7194-7202.

Zhu, et al., "Unpaired image-to- image translation using cycle-consistent adversarial networks", In Proceedings of the IEEE international conference on computer vision, Oct. 22, 2017, pp. 2223-2232.

Liu, et al., "Relighting Images in the Wild with a Self-Supervised Siamese Auto-Encoder", In Repository of arXiv:2012.06444v1, Dec. 11, 2020, 9 Pages.

* cited by examiner

220

210

200

210

250

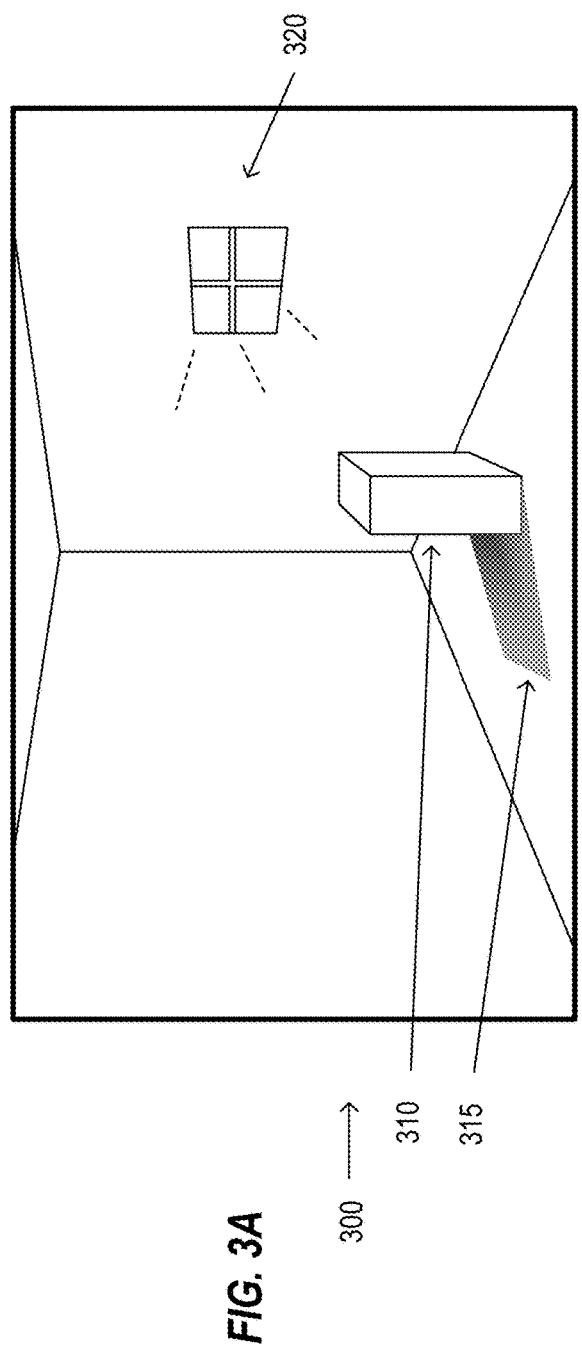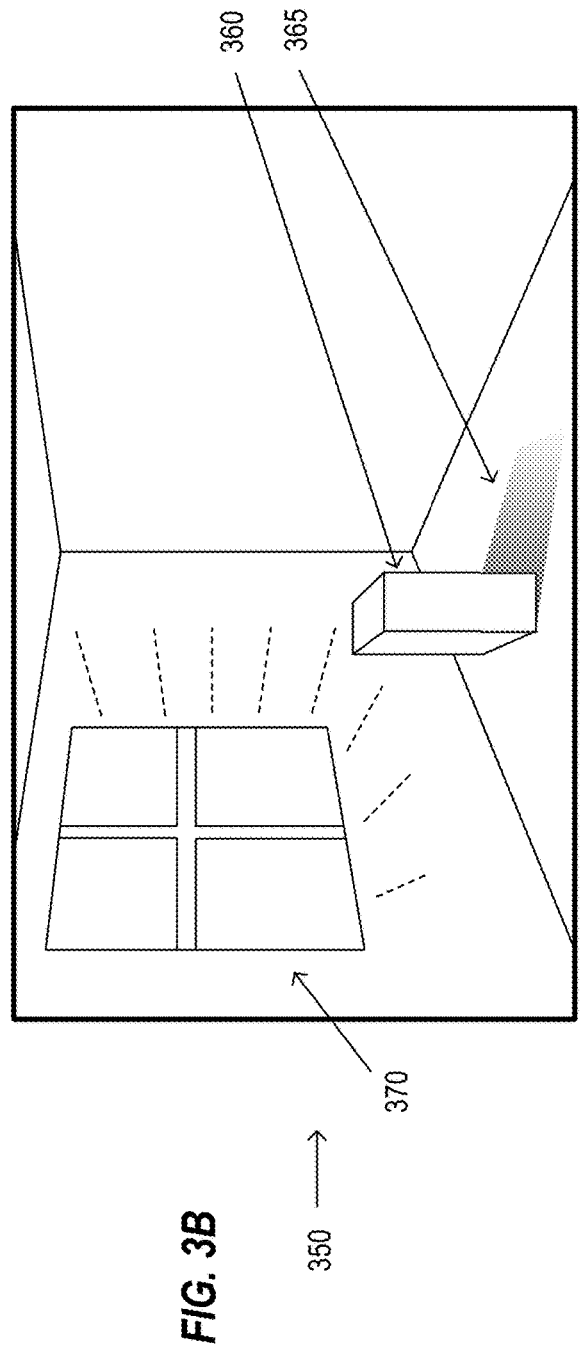
FIG. 3A
FIG. 3B

400 →

450 →

475 →

RELIGHTING SYSTEM FOR SINGLE IMAGES

BACKGROUND

Relighting images in the wild has gained popularity recently, especially since the development of mobile computing and video communication has led to an explosion in the consumption of digital photography. The diversity of the application environments, e.g., indoor, outdoor, day or night, makes the task of realistically relighting images challenging. In one use case scenario, users can choose the desired illumination of an image, without having to consider the illumination of the original image. However, even state-of-art lighting algorithms struggle to meet this use case scenario. The first problem is the lack of large-scale relighting datasets since it is difficult to manually label scene illumination, especially when there is more than one light source. The availability of a collection of labelled images has been an issue with many supervised relighting methods. The second problem is that most relighting algorithms require multiple views of the same subject for training, which hinders the algorithms from learning from wild data. The third problem is that relighting usually requires depth information to avoid artifacts from shadows or over-lighting.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to training a neural network to relight single view images in the wild. An autoencoder of the neural network deconstructs a source image into two separate embeddings: a first "content" embedding that represents the image's subject and background; and a second "illumination" embedding that represents the particular lighting environment in which the image was captured. With this separation of embeddings, a single image may be augmented using operations that do not significantly affect its content, providing several images with the same subject for training the neural network. Once trained, the neural network is configured to take an input image and i) generate a relighted image based on a target illumination embedding, ii) generate an estimated illumination embedding of the source image. Moreover, the neural network may estimate an illumination embedding for a desired background image and then generate a relighted image from a desired subject image based on the estimated illumination embedding so that the subject appears with lighting appropriate for the background image.

In accordance with some examples of the present disclosure, a method for training a neural network for relighting an image is described. A first training set that includes source images and a target illumination embedding is generated. The source images have respective illuminated subjects. A second training set that includes augmented images and the target illumination embedding is generated. The augmented images corresponding to the source images. A first autoencoder is trained using the first training set to generate a first output set that includes estimated source illumination embeddings and first reconstructed images that correspond to the source images. The reconstructed images have respective subjects that are i) from the corresponding source image, and ii) illuminated based on the target illumination embedding. A second autoencoder is trained using the second training set to generate a second output set that includes estimated augmented illumination embeddings and second reconstructed images that correspond to the augmented images.

In accordance with some examples of the present disclosure, a method for training a neural network for relighting an image is described. A first training set that includes source images and a target illumination embedding is generated. The source images have respective illuminated subjects. A first autoencoder is trained using the first training set to generate a second training set that includes estimated source illumination embeddings and transformed images that correspond to the source images, the transformed images having respective subjects that i) are from the corresponding source image, and ii) illuminated based on the target illumination embedding. A second autoencoder is trained using the second training set to generate reconstructed images and reconstructed illumination embeddings.

In accordance with some examples of the present disclosure, a method for relighting an input images described. The method may include receiving a single input image having an illuminated subject; and relighting the input image using a neural network and a target spherical harmonic lighting embedding to generate a relighted image having the subject of the single input image illuminated based on the target illumination embedding, the neural network having: a first autoencoder trained using a first training set that includes source images and a target illumination embedding, the source images having respective illuminated subjects, the first autoencoder being trained to generate a first output set that includes estimated source illumination embeddings and first reconstructed images that correspond to the source images, the reconstructed images having respective subjects that are i) from the corresponding source image, and ii) illuminated based on the target illumination embedding, and a second autoencoder trained using a second training set that includes augmented images and the target illumination embedding, the augmented images corresponding to the source images, the second autoencoder being trained to generate a second output set that includes estimated augmented illumination embeddings and second reconstructed images that correspond to the augmented images.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

FIG. 3A shows a diagram of another example source image having a subject and background illuminated by a light source, according to an example embodiment.

FIG. 3B shows a diagram of yet another example source image having a subject and background illuminated by a light source, according to an example embodiment.

DETAILED DESCRIPTION

Figure 1:
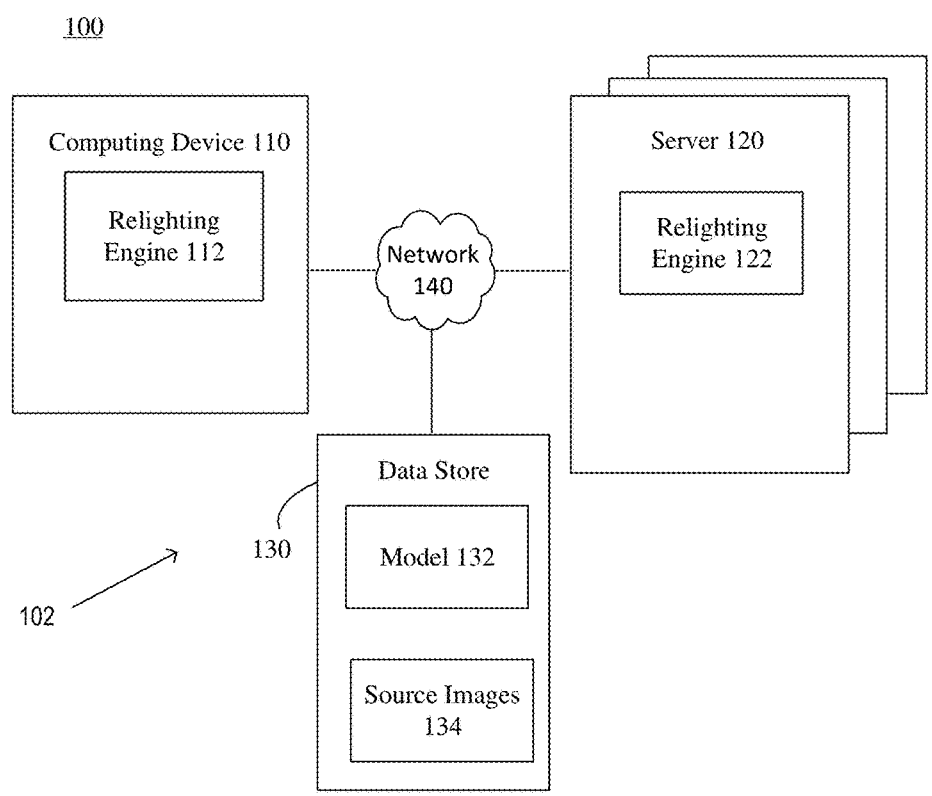
FIG. 1 shows a block diagram of an example of an environment in which a relighting system may be implemented, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of a neural network configured to automatically relight single images by training with a large-scale single-view unlabeled dataset. Once trained, the neural network takes a single input image and a target lighting embedding as inputs, estimates the lighting of the input image and subsequently generates a new, relighted image based on the target lighting embedding. In some embodiments, the neural network includes a self-supervised autoencoder network which decomposes the input image into two embeddings: one for illumination and one for content. Separation of the content embedding and illumination embedding is achieved by augmenting images in such a way that the subject and background of the images (e.g., geometry of the objects within the image) stay the same while the apparent direction of light changes. Example augmentations that suitably maintain the integrity of the content include flipping an image, rotating an image, and inverting colors of an image. Each augmentation image is paired up with the original image and used to train a Siamese autoencoder network. By assuming that the image training pairs have the same content but different illumination, the image content embedding is decoupled from the image illumination embedding.

Without ground truth light information for an image (e.g., measured or sensed lighting characteristics), the illumination embedding has a large number of possibilities and creates challenges for relighting by adjusting the illumination embedding manually. The relighting system described herein utilizes a spherical harmonic (SH) loss function that forces the illumination embedding to take the form of Laplace's spherical harmonics. When Spherical Harmonics represent the illumination embedding, the relighting can be meaningfully controlled (see T. M. MacRobert, Spherical Harmonics: an elementary treatise on harmonic functions with applications, 1947). Even without ground-truth illumination information, the relighting system may generate high-resolution (1024×1024) relighted images. Advantageously, the relighting can be controlled by adjusting the values in illumination embedding. Moreover, the use of augmented images and the SH loss function obviates the need for a prior shape model for the subject of an image or multiple source images for the subject.

This and many further embodiments for a relighting system are described herein. For instance, FIG. 1 shows a network-based computing system 100 that provides a relighting system 102 configured to train a neural network and relight images, in accordance with an example embodiment. As shown in FIG. 1, system 100 includes a computing device 110, one or more servers 120, and a data store 130. A network 140 communicatively couples computing device 110, server 120, and data store 130. Server 120 includes a relighting training engine 122 and a relighting processing engine. Computing device 110 includes a relighting engine 112. Data store 130 includes a neural network model 132 and source images 134 for training the neural network model 132, in some embodiments. In other embodiments, the source images 134 are omitted from the data store 130, but are stored in another suitable storage. These features of FIG. 1 are described in further detail as follows.

Network 140 may comprise one or more networks such as local area networks (LANs), wide area networks (WANs), enterprise networks, the Internet, etc., and may include one or more of wired and/or wireless portions. Server 120 may include one or more server devices, distributed computing platforms, and/or other computing devices. Computing device 110 may be any type of computing device, including a mobile computer or mobile computing device (e.g., a Microsoft® Surface® device, a laptop computer, a notebook computer, a tablet computer such as an Apple iPad™, a netbook, etc.), or a stationary computing device such as a desktop computer or PC (personal computer). Computing device 110 may be configured to execute one or more software applications (or "applications") and/or services and/or manage hardware resources (e.g., processors, memory, etc.), which may be utilized by users (e.g., customers) of the network-accessible server 120. Data store 130 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium.

Source images and neural network model 132 may be accessible from data store 130 via network 140 (e.g., in a "cloud-based" embodiment), and/or may be local to server 120 (e.g., stored in local storage). Server 120 and computing device 110 may include at least one wired or wireless network interface that enables communication with each other and data store 130 (or an intermediate device, such as a Web server or database server) via network 140. Examples of such a network interface include but are not limited to an IEEE 802.11 wireless LAN (WLAN) wireless interface, a Worldwide Interoperability for Microwave Access (WiMAX) interface, an Ethernet interface, a Universal Serial Bus (USB) interface, a cellular network interface, a Bluetooth™ interface, or a near field communication (NFC) interface. Examples of network 140 include a local area network (LAN), a wide area network (WAN), a personal area network (PAN), the Internet, and/or any combination thereof.

In an embodiment, one or more data stores 130 may be co-located (e.g., housed in one or more nearby buildings with associated components such as backup power supplies, redundant data communications, environmental controls, etc.) to form a datacenter, or may be arranged in other manners. Accordingly, in an embodiment, one or more of data stores 130 may be a datacenter in a distributed collection of datacenters.

Computing device 110 includes relighting engine 112, and server 120 includes relighting training engine 122. The relighting engines 112 and 122 are embodiments of a system configured to deconstruct source images into two separate embeddings: a first "content" embedding that represents the image's subject and background; and a second "illumination" embedding that represents the particular lighting environment in which the image was captured, for example, an appropriate directional lighting of the environment. The relighting engines augment the source images using operations that do not significantly affect the content, providing several augmented images with the same subject as a source image for training the neural network model 132. Once trained, the neural network is configured to take an input image and i) generate a relighted image based on a target illumination embedding, ii) generate an estimated illumination embedding of the source image. Moreover, the neural network may estimate an illumination embedding for a desired background image and then generate a relighted image from a desired subject image based on the estimated illumination embedding so that the subject appears with lighting appropriate for the background image (e.g., directional lighting or other suitable lighting effects).

As used herein, the terms "source image" and "reference image" include, but are not limited to images, video data (e.g., stills of a video), or other suitable image data. For example, images may include JPEG images, GIF images, BMP images, PNG images, RAW images, or other suitable image file formats.

The above embodiments, and further embodiments, are described in further detail in the following subsections.

Figure 2A:
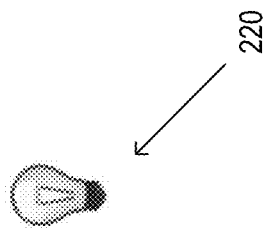
FIG. 2A shows a diagram of an example source image having a subject illuminated by a light source, according to an example embodiment.
Figure 2A:
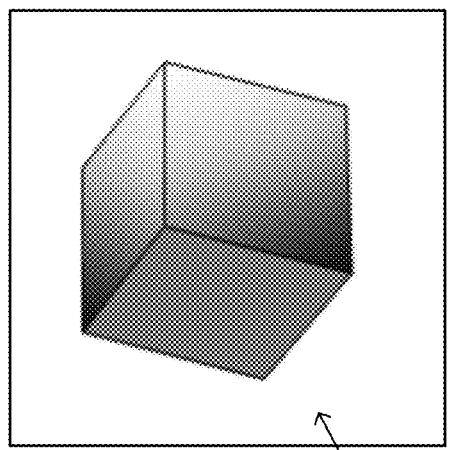
Figure 2B:
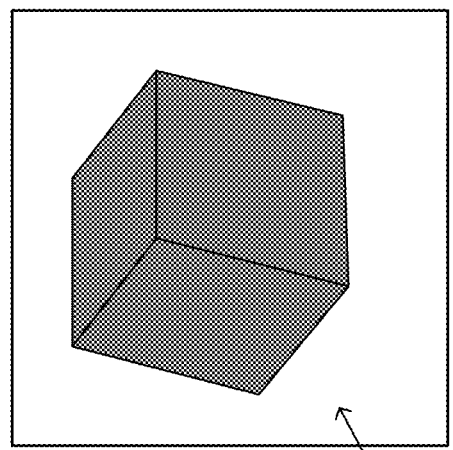
FIG. 2B shows a diagram of the subject of FIG. 2A with neutral lighting, according to an example embodiment.

FIG. 2A shows a diagram of an example source image 200 having an illuminated subject 210, according to an example embodiment. For ease of explanation, the subject 210 is a cube and the only subject within the source image 200. Moreover, the source image 200 does not include a background. In other embodiments, a source image may have two, three, or more subjects, along with additional objects or scenes in a background. In the source image 200, the subject 210 has the appearance of being illuminated from the right side of the page, approximately from a location indicated by the light source 220. Although the light source 220 is not part of the content of the image 200, source images in other embodiments include one, two, three, or more light sources as part of their content. In various embodiments, a light source within an image is a direct source of light (e.g., a lamp, window, the sun, etc.) or an indirect source of light (e.g., a reflective surface, mirror, shiny wood floor, etc.). For comparison, FIG. 2B shows a diagram of the subject 210 of FIG. 2A with neutral lighting, according to an example embodiment.

FIG. 3A shows a diagram of another example source image 300 having a subject 310 and background illuminated by a light source 320, according to an example embodiment. In this embodiment, the source image 300 includes a small window as the light source 320, which casts a shadow 315 from subject 310 (a podium) in the background. FIG. 3B shows a diagram of yet another example source image 350 having a subject 360 and background illuminated by a light source 370, according to an example embodiment. In this embodiment, the source image 350 includes a large window as the light source 370, which casts a shadow 365 in the background.

Figure 4A:
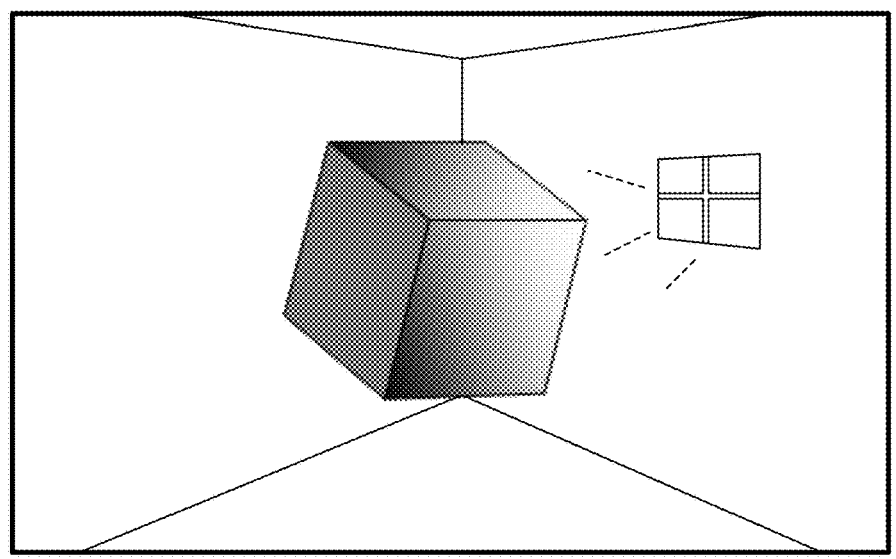
FIG. 4A shows a diagram of an example relighted image having the subject of FIG. 2A illuminated by a light source consistent with the background of FIG. 3A, according to an example embodiment.
Figure 4B:
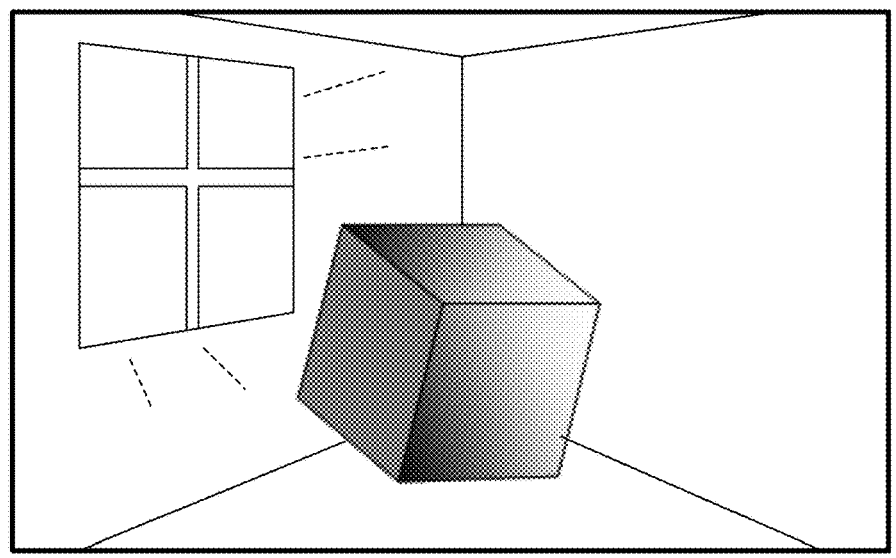
FIG. 4B shows a diagram of another example image having the subject of FIG. 2A illuminated by a light source consistent with FIG. 2A, according to an example embodiment.
Figure 4C:
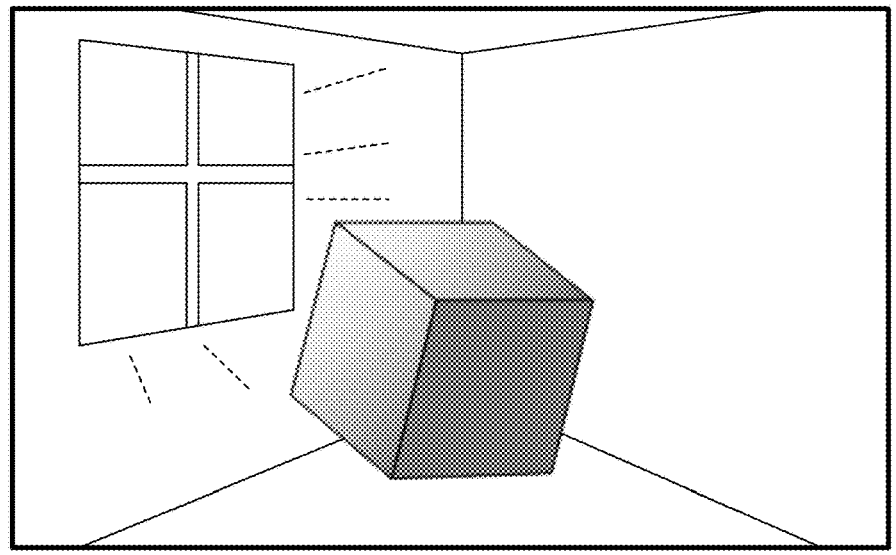
FIG. 4C shows a diagram of an example relighted image having the subject of FIG. 2A illuminated by a light source consistent with the background of FIG. 3B, according to an example embodiment.

FIG. 4A shows a diagram of an example image 400 having the subject 210 of FIG. 2A with the background of FIG. 3A, according to an example embodiment. In this embodiment, the lighting of the subject 210 is consistent with the light source in the background. However, in some scenarios, a user may want to place the subject of one image into the background of another image. FIG. 4B shows a diagram of another example image 450 having the subject 210 of FIG. 2A illuminated by a light source consistent with FIG. 2A, according to an example embodiment. In other words, FIG. 4B shows one scenario of placing a subject from a first image into a second image without relighting the subject. As can be seen in FIG. 4B, the subject 210 looks unnatural because the lighting of the subject does not match what would normally be present due to the background of FIG. 4B. FIG. 4C shows a diagram of an example relighted image 475 having the subject 210 of FIG. 2A illuminated by a light source consistent with the background of FIG. 3B, according to an example embodiment. In an embodiment, the relighting system 102 described herein is configured to take the image 200 as an input image and i) generate the relighted image 475 based on a target illumination embedding, and ii) generate an estimated illumination embedding of the source image. Moreover, the relighting system 102 estimates an illumination embedding for the background image 350, which is utilized to generate the relighted image 475 so that the subject 210 appears with lighting appropriate for the background image.

Figure 5:
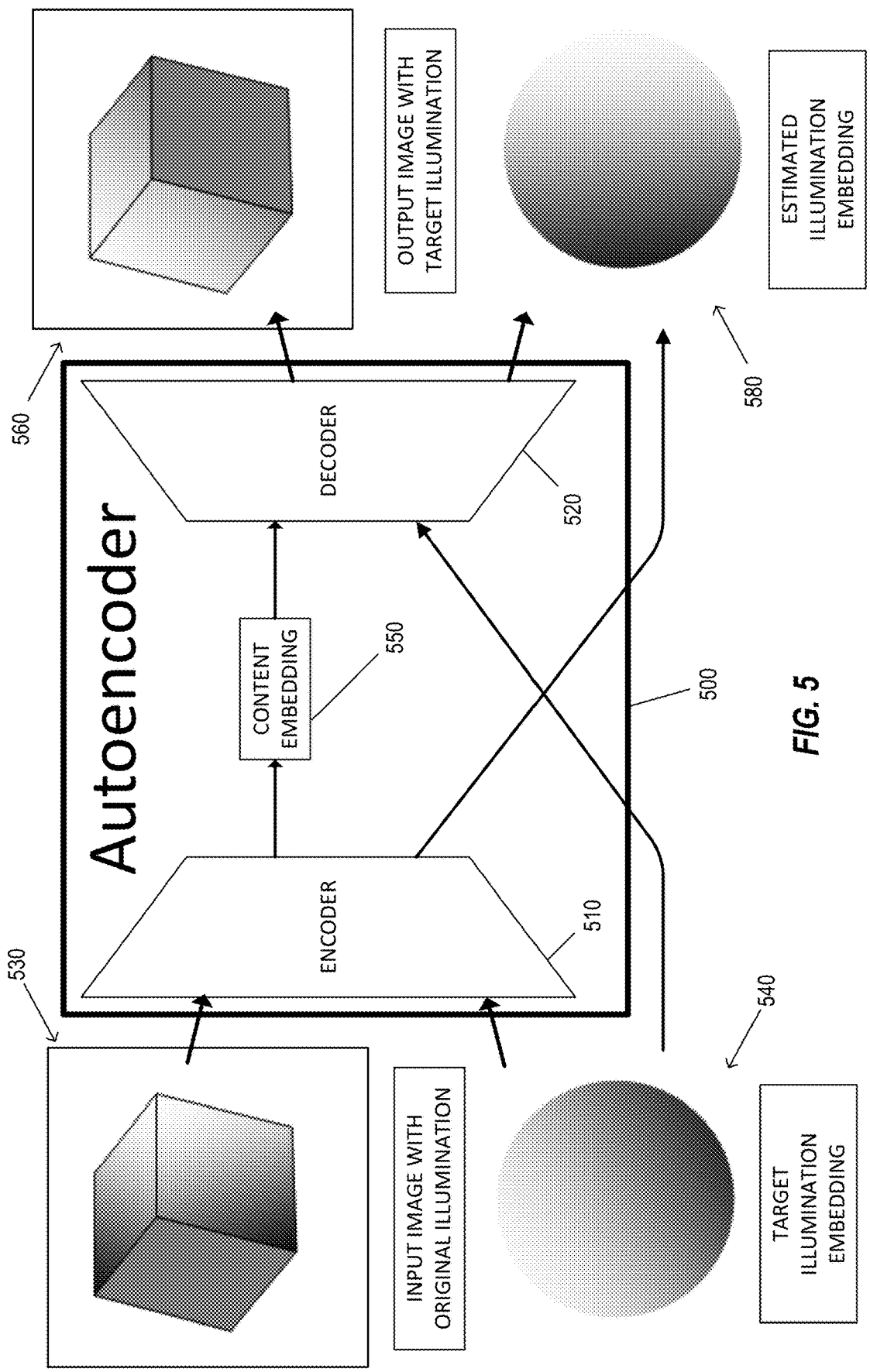
FIG. 5 shows a block diagram of an example relighting system, according to an example embodiment.

FIG. 5 shows a block diagram of an example neural network of the relighting system 102, according to an example embodiment. In the embodiment shown in FIG. 5, the neural network is implemented as an autoencoder 500. The autoencoder 500 is a neural network that learns to copy its input to its output. The autoencoder 500 has internal (hidden) layers that describe a code or embedding used to represent the input, and generally includes two main parts: an encoder 510 configured to map the input into the embeddings, and a decoder 520 configured to map embeddings to a reconstruction of the input. Performing the copying task perfectly would simply duplicate the signal, and this is why autoencoders usually are restricted in ways that force them to reconstruct the input approximately, preserving the most relevant aspects of the data in the copy. In an embodiment, the neural network model 132 generally corresponds to the parameters associated with the autoencoder 500.

The encoder 510 is configured to receive and decompose or deconstruct an input image 530 (also referred to herein as an "input image I with illumination embedding L," or $I_L$) into a content embedding 550 ("C") and an estimated illumination embedding 580 ("$\hat{L}$"). Input images are represented according to:

$$I_L \in \mathbb{R}^{w \times h \times 3}$$

where I is the input image with illumination embedding L, w and h are the width and height of the input image (with 3 values for RGB). The content embedding C (550) and illumination embedding L (580) are two tensors provided by $$C \in \mathbb{R}^{m \times m \times d}$$

and $$\hat{L} \in \mathbb{R}^n$$

where n is the size of the illumination embedding, m is the size of the content embedding, and d is the depth of the content embedding. Using this arrangement, the encoder 510 ("E") can be represented as $$\{C, \hat{L}\} = E(I_L)$$

Using the decoder 520 ("D"), the autoencoder 500 is configured to rebuild the relighted image according to:

$$\hat{I}_{L'} = D(C, L')$$

where $\hat{I}_{L'}$ is the relighted image. The decoder 520 receives the content embedding 550 and a target illumination embedding 540 and generates an output image 560 using the content of the input image 530 and the lighting of the target illumination embedding 540.

Training of the autoencoder 500 is performed using one or more objective or "cost" functions, in various embodiments. In the embodiments described herein, the objective functions include a reconstruction loss, Spherical Harmonic loss, and discriminator loss. In other embodiments, one or more of the objective functions may be omitted, or additional objective functions added.

Figure 6:
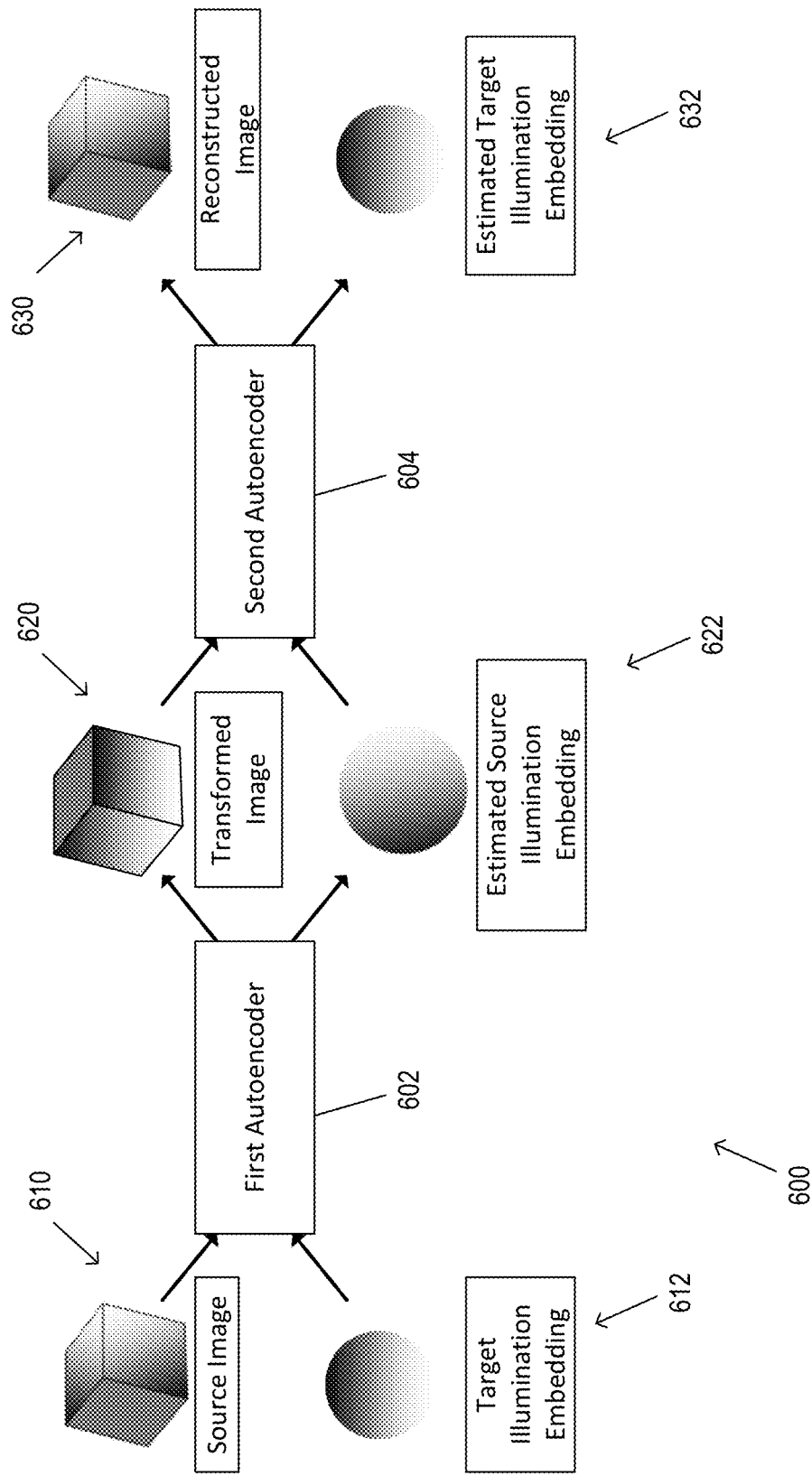
FIG. 6 shows a block diagram of an example reconstruction network of a relighting system, according to an example embodiment.

FIG. 6 shows a block diagram of an example reconstruction network 600 of the relighting system 102, according to an example embodiment. An autoencoder network can learn E and D that can relight images from a large number of relighted image pairs. However, the ground truth illumination embedding and relighted images are not available for wild images. To address this problem, the relighting system 102 includes first and second autoencoders 602 and 604 that form the reconstruction network 600. In various embodiments, the first and second autoencoders 602 and 604 generally correspond to instances of the autoencoder 500. In some of these embodiments, the first autoencoder 602 receives a source image 610 (corresponding to input image 530) and a target illumination embedding 612 (corresponding to target illumination embedding 540) and generates a transformed image 620 (corresponding to output image 560) and estimated source illumination embedding 622 (corresponding to illumination embedding 580). The second autoencoder 604 in these embodiments receives the transformed image 620 and estimated source illumination embedding 622 and generates a reconstructed image 630 (corresponding to output image 560) and estimated target illumination embedding 632 (corresponding to illumination embedding 580).

The autoencoders 602 and 604 have the same structure and their weights are shared. Therefore, these two autoencoders may be referred to as a Siamese autoencoder. Since the transformed image 620 is generated based upon the content embedding of the source image 610 and the reconstructed image 630 is generated based upon the content embedding of the transformed image 620 and the estimated source illumination embedding 622, the reconstructed image 630 should closely correspond to the source image 610. Moreover, since the structure and weights of the first and second autoencoders 602 and 604 are shared, the source image 610 may be compared to the reconstructed image 630 (e.g., to minimize their differences) to learn suitable weights for the neural network model 132. As can be seen in FIG. 6, the target illumination embedding 612 is not relied upon for learning the weights, so its actual value may be randomly generated, pseudo-randomly generated, or simply a predetermined value (or tensor). In some embodiments, the autoencoders 602 and 604 are separate autoencoders with shared weights. In other embodiments, the autoencoders 602 and 604 are the same autoencoder but with varying inputs, as described above.

In the equations for the reconstruction network 600 provided herein, $I_L$ corresponds to source image 610, which may be selected from a training dataset, for example, in the source images 134. L' corresponds to the target illumination embedding 612. As described above, in various embodiments, the target illumination embedding 612 is randomized (e.g., randomly or pseudo-randomly generated) during a training period or epoch. In other embodiments, the target illumination embedding 612 is a predetermined illumination embedding selected for the training period. $\hat{I}_L$ and $\hat{I}_{L'}$ correspond to the reconstructed image 630 and the transformed image 620, respectively. $\hat{L}$ and $\hat{L}'$ are the estimated source illuminations from $I_L$ and $\hat{I}_{L'}$, respectively. The reconstruction network 600 then takes source image $I_L$ and target lighting L' as input and generates $\hat{I}_L$ and $\hat{L}'$. $I_L$ and L' are used as ground truth to supervise the training for reconstruction, in some embodiments. The reconstruction loss is a mean absolute error loss for the reconstructed image $\hat{I}_L$ and the estimated lighting embedding $\hat{L}'$. In some embodiments, an image gradient between the source images and reconstructed images is also considered with mean absolute error loss to preserve edges and avoid blurring. Accordingly, the reconstruction loss for the reconstruction network 600 in this embodiment is:

$$\mathcal{L}_{roc}(I_L, L') = \frac{1}{w*h}(\|I_L - \hat{I}_L\|_1 + \|\nabla I_L - \nabla \hat{I}_L\|_1) + \frac{1}{n}\|L' - \hat{L}'\|_1$$

where $\mathcal{L}_{roc}(I_L, L')$ is represented as $\mathcal{L}_{roc}(I_L)$ since L' is given and fixed during a training period.

Figure 7:
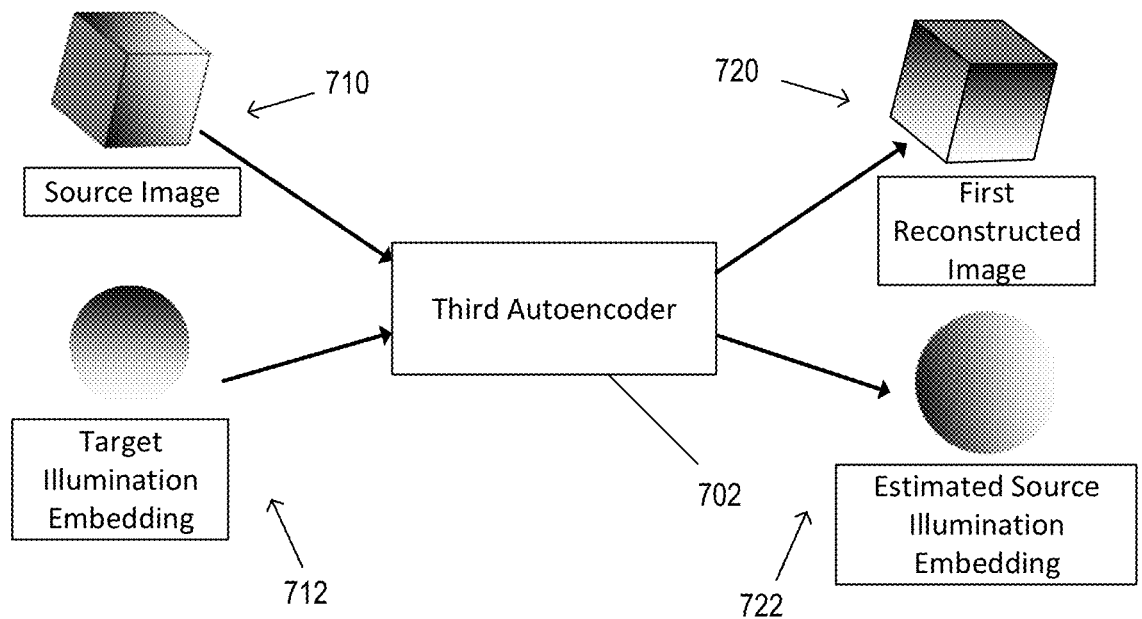
FIG. 7 shows a block diagram of an example comparison network of a relighting system, according to an example embodiment.
Figure 7:
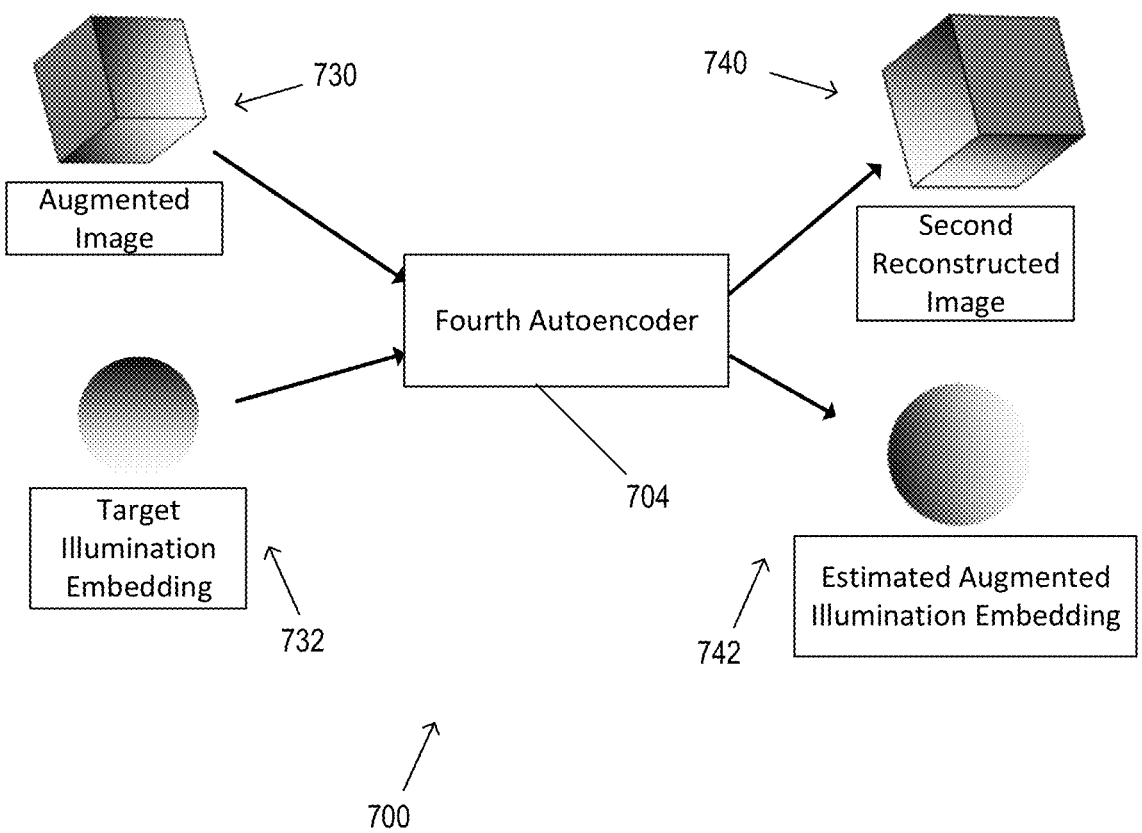

FIG. 7 shows a block diagram of an example comparison network 700 of the relighting system 102, according to an example embodiment. The comparison network 700 includes a third autoencoder 702 and a fourth autoencoder 704. In various embodiments, the third and fourth autoencoders 702 and 704 generally correspond to instances of the autoencoder 500. In some embodiments, the autoencoders 702 and 704 correspond to the autoencoders 602 and 604 and have the same structure and weights, but use different inputs to provide their respective outputs. In an embodiment, a single instance of the autoencoder 500 implements the autoencoders 602, 604, 702, and 704, using the different inputs to provide the respective outputs described herein. In some scenarios, the use of more than one autoencoder having shared weights reduces the time needed to train the neural network model 132. In other scenarios, the use of more than one autoencoder allows for one, two, or more subsequent training periods to be performed in a similar total timeframe.

Although the reconstruction loss described above with respect to FIG. 6 can let the relighting system 102 converge, $\hat{I}_L$, and $\hat{L}$ lack constraints. In other words, the relighting system 102 could map the same image and illumination embedding to any random image and illumination in the target domain, and any of the learned mappings could induce an output distribution that matches the target distribution. Thus, reconstruction losses alone cannot guarantee that the relighting system 102 can relight images accurately. To further reduce the space of possible mapping functions, a spherical harmonic loss is applied as a constraint on $\hat{I}_{L'}$.

Spherical Harmonic loss ensures that the illumination embedding is represented by Spherical Harmonic lighting. For controlling the illumination, Spherical Harmonic lighting is used to represent the illumination, shown in FIG. 8, where b is the bias and its value is $\sqrt{\pi}/2$. X, Y, Z means the channels is linearly dependent on the x, y and z axis in the space. Since the Spherical Harmonics of the source images 134 are unknown, some augmented images A are used as the associated images to calculate the Spherical Harmonic Loss. The spherical harmonic loss generally forces the representation of the illumination embedding to be converted to spherical harmonics, which allows for the use of augmented images with similarly augmented illumination embedding to be used for comparison purposes when training the neural network model 132, thus the neural network model 132 is self-supervised. Advantageously, this approach allows for the use of "in the wild" images (instead of artificial or generated images having known lighting embeddings) when training the neural network model 132, which improves lighting accuracy when relighting other real-world images.

In the embodiment shown in FIG. 7, the autoencoder 702 receives a source image 710 (corresponding to input image 530) and a target illumination embedding 712 (corresponding to target illumination embedding 540) and generates a first reconstructed image 720 (corresponding to output image 560) and estimated source illumination embedding 722 (corresponding to illumination embedding 580). The autoencoder 704 receives an augmented image 730 (corresponding to input image 530) and a target illumination embedding 732 (corresponding to target illumination embedding 540) and generates a second reconstructed image 740 (corresponding to output image 560) and estimated augmented illumination embedding 742 (corresponding to illumination embedding 580). In some embodiments, the target illumination embedding 732 and the target illumination embedding 712 are the same.

In various embodiments, the augmentations include a horizontally flipped image $A_x$, a vertically flipped image $A_y$, a rotated 90 degrees image $A_{xy}$, and a color inverted image $A_z$. These augmentations change some values in the illumination embedding, which is shown adjacent to the corresponding augmented image in FIG. 8 and incorporated into comparisons of the estimated illumination embeddings. The channels are shown with the changed channels highlighted. Since $A_{xy}$ is given by rotation, the order of some channels is changed, as indicated by arrows. Specifically, the 2-nd and 6-th channels are swapped with 4-th and 8-th channels, respectively. Although $A_y$ and $A_{xy}$ introduce unnatural upside down or tilted images, this does not significantly complicate the operation of the autoencoder.

The inversion augmentation $A_z$ is different from the $A_x$, $A_y$, and $A_{xy}$ (which can be calculated based on flip and rotation operations), so the comparison network 700 is configured to approximate a lighting change in a depth direction. Since the illumination information in depth can not be directly obtained from an input image, the comparison network 700 is configured to utilize a pretrained depth prediction model, such as SfSNet.

In an embodiment, the augmented image is generated by converting the source image from an RGB color space to CIELAB color space. The depth of the augmented image is estimated using the pretrained depth prediction model. The subject of the augmented image is separated from a background of the augmented image using the estimated depth. In an embodiment, for example, the depth information is applied to separate foreground objects (faces, cars and so on) from the background. The pixels with low depth value generally belong to the objects while pixels with high depth value belong to the background. Then, a perceptual lightness channel of the subject of the augmented image is inverted using the estimated depth, without inverting the perceptual lightness channel of the background. In an embodiment, an inversion approximation is performed according to:

$$\mathbb{L}(A_Z) = \frac{\|(1_{w*h} - \mathcal{D}(I)) \circ \mathbb{L}(I) + \mathcal{D}(I) \circ \tanh(\mathbb{L}(I))/2\|_1}{w*h}$$

where ∘ is the Hadamard product, L(.) is a function to calculate the L channel information in LAB color space, and tanh is a tanh function. $A_z$ is the image with $L(A_z)$. Tanh( )/2 is an adjustable scale function. Based on the above-described properties, the relighting task is converted to a comparison task to be handled by the comparison network 700.

IL is an image from the dataset, whose illumination embedding is L and L' is a randomized illumination embedding. The augmented image is shown as A, where $$A \in \{A_x, A_y, A_{xy}, A_z\}$$

The relighted image $I_L$ and A with the target illumination embedding L' are shown as $\hat{I}_{L'}$ and $\hat{A}_{L'}$, respectively. The estimated illumination embedding of $I_L$ and A are $\hat{L}$ and $\hat{L}_A$. By comparing $\hat{L}$ and $\hat{L}_A$, the Spherical Harmonic loss is provided by:

$$\mathcal{L}_{sh}(I_L, A) = 1_{9 \times 1}^T \hat{L} + C(A)\hat{L}_A - \sqrt{\pi}$$

where $$C(A) = \begin{cases} [1, -1, -1, 1, 1, -1, -1, -1]^T & A = A_x \\ [1, 1, -1, -1, 1, 1, -1, -1, -1]^T & A = A_y \\ [1, -1, -1, -1, 1, -1, -1, -1, -1]^T & A = A_{xy} \\ [1, -1, 1 -1, -1, 1, -1, 1, -1]^T & A = A_z \end{cases}$$

and $1^T_{9 \times 1}$ vector, where each element value is 1. The sum of the first channel of $I_L$ should be equal to $\sqrt{\pi}$ since the bias is $\sqrt{\pi}/2$. For channels 2-9 of the illumination embedding of $I_L$ and A, the difference of the unchanged channel an sum of the unchanged channel are both equal to zero.

Figure 8:
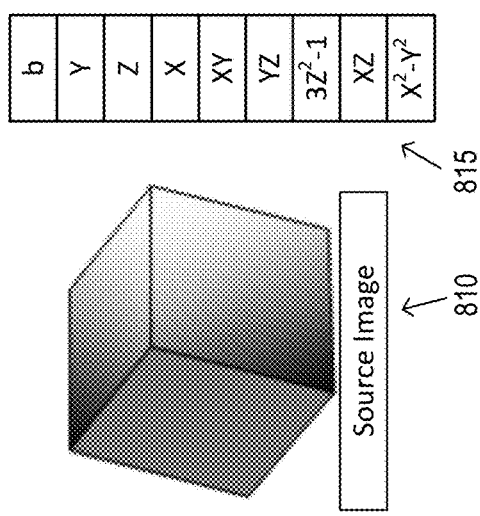
FIG. 8 shows a diagram of example augmented images generated by a relighting system, according to an example embodiment.
Figure 8:
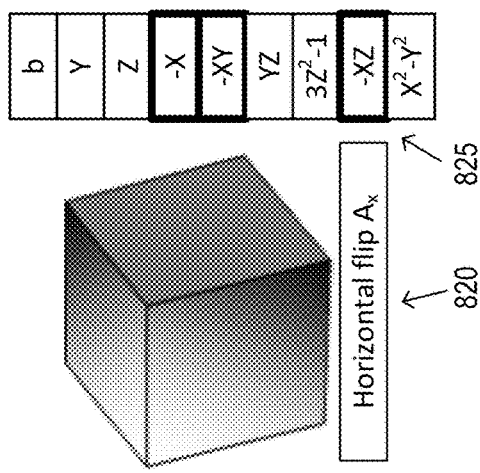
Figure 8:
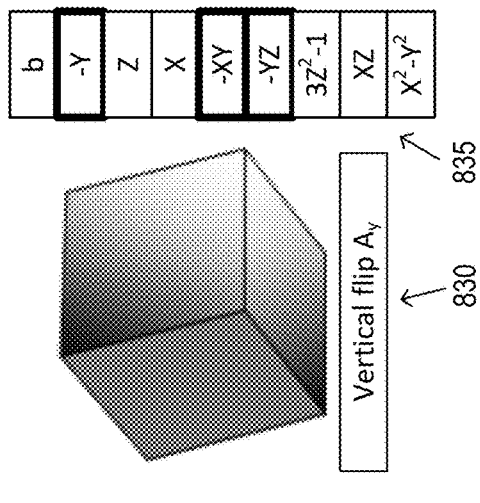
Figure 8:
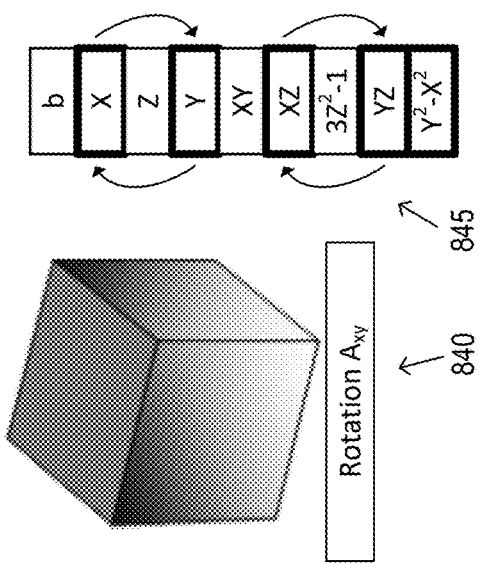
Figure 8:
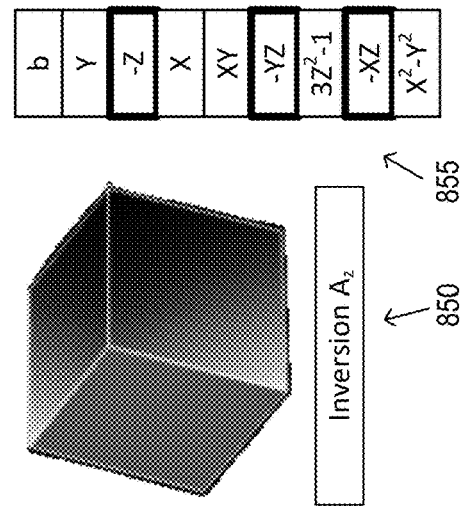

FIG. 8 shows a diagram of example augmented images 820, 830, 840, and 850 generated by the relighting system 102, according to an example embodiment. The augmented images 820, 830, 840, and 850 are based upon source image 810 and correspond to a horizontal flip, vertical flip, 90° rotation, and color inversion, respectively. Data structures 815, 825, 835, 845, and 855 correspond to the illumination embeddings of the source image 810 and augmented images 820, 830, 840, and 850, respectively. Although four augmented images are shown in FIG. 8 and utilized in the embodiments described herein, fewer augmented images may be used in other embodiments and additional, or different augmented images may be used in still other embodiments.

The use of image flipping and rotation of images may result in image artifacts due to inaccurate estimation of object depth and lighting. In some embodiments, a discriminator loss is utilized by the relighting system 102 as a constraint on relighted images. In an embodiment, the discriminator loss is a generative adversarial network (GAN) loss, such as a Wasserstein GAN+Gradient Penalty function. In this embodiment, the discriminator loss is provided by:

$$\mathcal{L}_{dis}(I_L) = \mathbb{E}_{I_L} C(D(E(I_L), L'))^2 - \mathbb{E}_{I_L}(C(I_L))^2$$

where C is the critic (discriminator) where the relighted images are $E(I_L)$ and $I_L$ are the real images.

The overall loss for the relighting system 102 is a linear combination of the objective functions. In an embodiment, the overall loss is the combination of the reconstruction loss, discriminator loss, and Spherical Harmonic loss, provided by:

$$\mathcal{L} = \mathcal{L}_{roc}(I_L) + \alpha \mathcal{L}_{dis}(I_L) + \frac{1}{4} \sum_{A \in \{A_x, A_y, A_{xy}, A_z\}} \mathcal{L}_{roc}(A) + \beta \mathcal{L}_{sh}(I_L, A)$$

where α=0.5 and β=0.25. In an embodiment, the relighting system 102 is trained using images of resolution 1024×1024.

An example structure of the model 132 is now described. Source images pass through six down-sampling layers and eight residual blocks. Then the embedding passes through three residual blocks and two residual blocks with a fully-connected layer to get the content and illumination embeddings, respectively. The size m and depth d of the content embedding are set as 64 and 512, respectively. Then these embeddings are added after several residual blocks. Finally, a relighted image is generated after six up-sampling layers. Since the encoder losses some information present in the input images, the reconstructed image appears blurry. Therefore, six skip layers are added between the down-sampling and up-sampling layers.

In some embodiments, the source images for training the relighting engine 112 are selected from a first dataset for an initial training period and then from a second dataset for a subsequent training period. In these embodiments, the first dataset may be a general purpose or generic dataset having a variety of subjects or objects (e.g., people, faces, cars, pets, indoor environments) while the second dataset is more particular (e.g., only faces in indoor environments, or only cars in outdoor environments) to allow fine-tuning of the neural network model 132 for a desired use of the relighting engine 112. Advantageously, the use of augmented images that are generated based on the source images allows for the first and second datasets to be unlabeled data sets (e.g., datasets that do not contain explicit lighting information).

Figure 9:
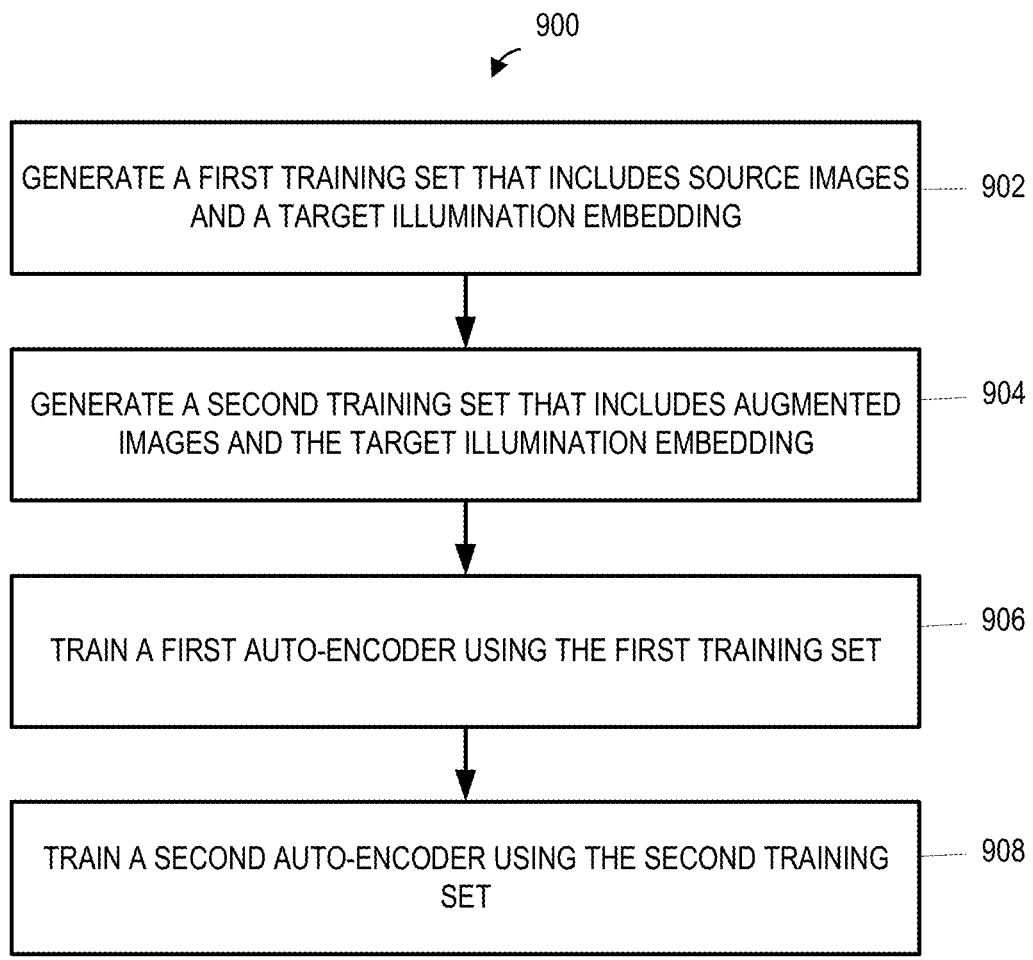
FIG. 9 shows a flowchart of an example method of training a neural network for relighting an image, according to an example embodiment.

FIG. 9 shows a flowchart of an example method 900 of training a neural network for relighting an image, according to an example embodiment. Method 900 includes steps that may incorporate aspects of steps shown in FIGS. 10 and 11. Technical processes shown in these figures will be performed automatically unless otherwise indicated. In any given embodiment, some steps of a process may be repeated, perhaps with different parameters or data to operate on.

Steps in an embodiment may also be performed in a different order than the top-to-bottom order that is laid out in FIG. 9. Steps may be performed serially, in a partially overlapping manner, or fully in parallel. Thus, the order in which steps of method 900 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim.

Method 900 begins with step 902. In step 902, a first training set that includes source images and a target illumination embedding is generated, in an embodiment. The source images and target illumination embedding generally correspond to the source images 710 and target illumination embedding 712, in an embodiment. The source images have respective illuminated subjects. The source images include images such as the image 200, 400, or 475, in an embodiment. In some examples, the source images are selected from an unlabeled image dataset, for example, the YouTube-8M dataset or CelebA dataset.

In step 904, a second training set that includes augmented images and the target illumination embedding is generated, in an embodiment. The augmented images correspond to the source images. In an embodiment, the augmented images and the target illumination embedding generally correspond to the augmented image 730 and target illumination embedding 732. In some embodiments, generating the second training set includes generating an augmented image from a source image by flipping the source image horizontally or vertically. In other embodiments, generating the second training set includes generating an augmented image from a source image by rotating the source image. In still other embodiments, generating the second training set includes generating an augmented image from a source image by color inverting the source image. In an embodiment, the augmented images are generated according to any combination of horizontal flipping, vertical flipping, rotating, and/or color inversion.

In step 906, a first autoencoder is trained using the first training set to generate a first output set that includes estimated source illumination embeddings and first reconstructed images that correspond to the source images, in an embodiment. The reconstructed images have respective subjects that are i) from the corresponding source image, and ii) illuminated based on the target illumination embedding.

In step 908, a second autoencoder is trained using the second training set to generate a second output set that includes estimated augmented illumination embeddings and second reconstructed images that correspond to the augmented images. In an embodiment, the first and second autoencoders have a same structure and shared weights. In an embodiment, the first autoencoder generally corresponds to the autoencoder 702 and the second autoencoder generally corresponds to the autoencoder 704.

In some embodiments, a loss function for the training of the first and second autoencoders includes minimizing a difference between the estimated source illumination embedding and the corresponding estimated augmented illumination embeddings. The loss function represents the estimated source illumination embedding and the corresponding estimated augmented illumination embeddings using spherical harmonics.

In an embodiment, generating the augmented image from the source image by color inverting includes: converting the source image from an RGB color space to CIELAB color space to generate the augmented image; estimating depth of the augmented image using a pretrained depth prediction model; separating a subject of the augmented image from a background of the augmented image using the estimated depth; and inverting a perceptual lightness channel of the subject of the augmented image using the estimated depth without inverting the perceptual lightness channel of the background.

In some embodiments, method 900 further includes training a third autoencoder using the first training set to generate a third training set that includes estimated source illumination embeddings and transformed images that correspond to the source images, the transformed images having respective subjects that i) are from the corresponding source image, and ii) illuminated based on the target illumination embedding; and training a fourth autoencoder using the third training set to generate reconstructed images and reconstructed illumination embeddings, wherein the third and fourth autoencoders have a same structure and shared weights.

Figure 10:
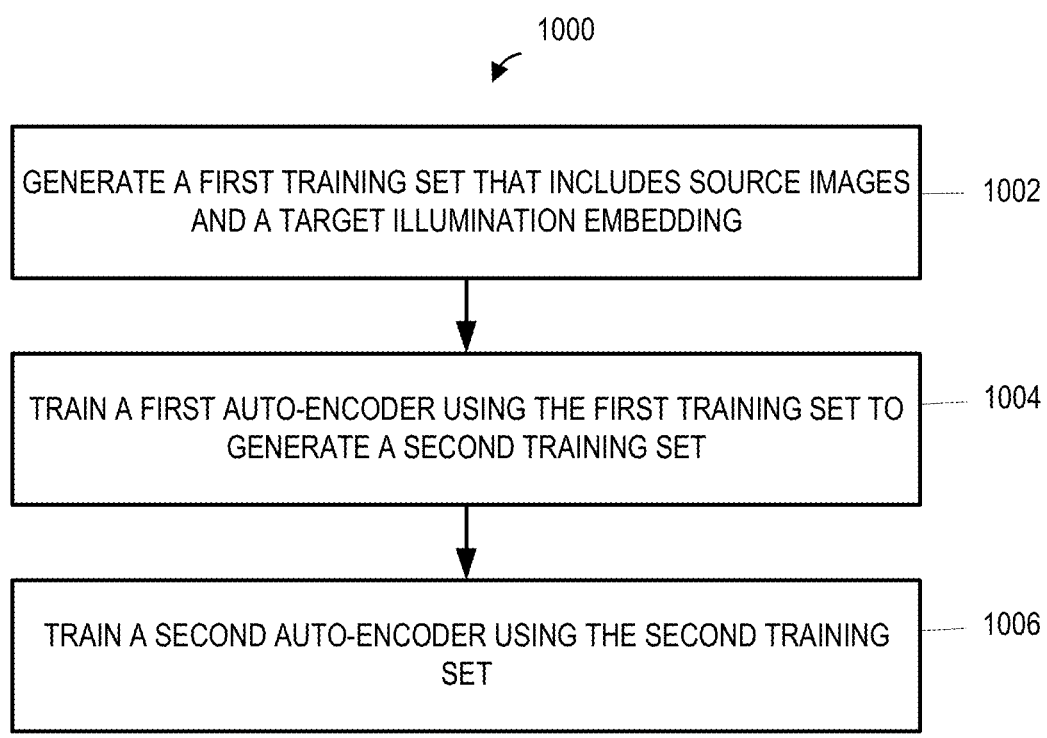
FIG. 10 shows a flowchart of an example method of training a neural network for relighting an image, according to an example embodiment.

FIG. 10 shows a flowchart of an example method 1000 of training a neural network for relighting an image, according to an example embodiment. Method 1000 includes steps that may incorporate aspects of steps shown in FIGS. 9 and 11. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 10. Steps may be performed serially, in a partially overlapping manner, or fully in parallel. Thus, the order in which steps of method 1000 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim.

Method 1000 begins with step 1002. In step 1002, a first training set that includes source images and a target illumination embedding is generated, in an embodiment. The source images have respective illuminated subjects. In an embodiment, the source images and the target illumination embedding generally correspond to the source images 610 and the target illumination embedding 612. The source images include images such as the image 200, 400, or 475 or may be selected from a commercially available dataset of images, in various embodiments. In an embodiment, the target illumination embedding is a randomized illumination embedding and generally corresponds to target illumination embedding 612. In some embodiments, the source images are selected from an unlabeled image dataset, in that images of the dataset do not contain metadata about the illumination of the images.

In step 1004, a first autoencoder is trained using the first training set to generate a second training set that includes estimated source illumination embeddings and transformed images that correspond to the source images, in an embodiment. The transformed images have respective subjects that i) are from the corresponding source image, and ii) illuminated based on the target illumination embedding. The first autoencoder generally corresponds to the autoencoder 602 and the second autoencoder generally corresponds to the autoencoder 604, in an embodiment. The second training set generally corresponds to the training set 620, in an embodiment.

In step 1006, a second autoencoder is trained using the second training set to generate reconstructed images and reconstructed illumination embeddings. In an embodiment, the first and second autoencoders have a same structure and shared weights. The first autoencoder generally corresponds to the autoencoder 602 and the second autoencoder generally corresponds to the autoencoder 604, in an embodiment. The reconstructed images and reconstructed illumination embeddings generally correspond to the reconstructed image 630 and estimated target illumination embedding 632, in an embodiment.

In some embodiments, the method 1000 also includes self-supervising the training of the first and second autoencoders using the source images and target illumination embedding as ground truths. In one such embodiment, a loss function for the training of the first and second autoencoders includes i) mean absolute error loss between the source images and reconstructed images, ii) mean absolute error loss between the reconstructed illumination embeddings and the target illumination embedding, and ii) mean absolute loss of image gradient between the source images and reconstructed images.

Figure 11:
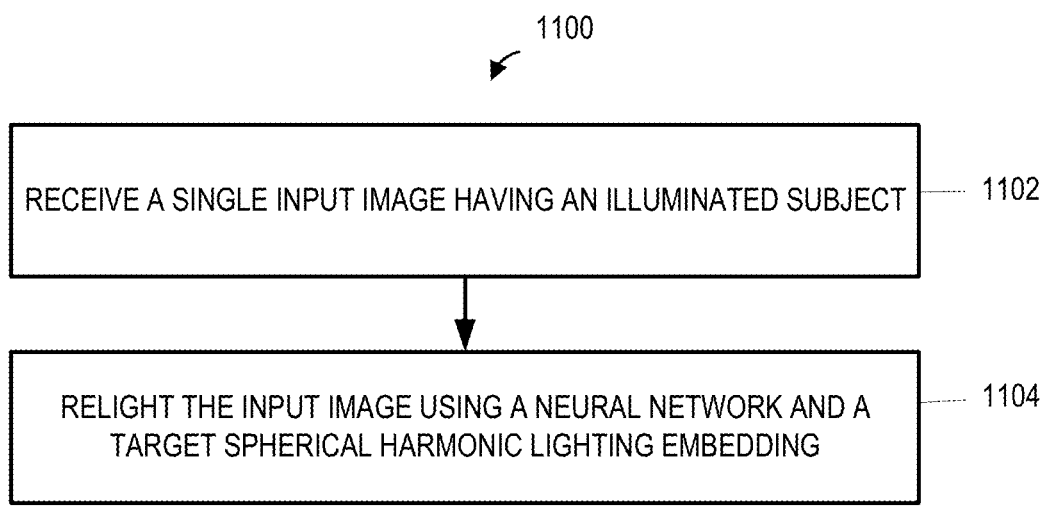
FIG. 11 shows a flowchart of an example method of relighting an input image, according to an example embodiment.

FIG. 11 shows a flowchart of an example method 1100 of relighting an input image, according to an example embodiment of the relighting system 102. Method 1100 includes steps that may incorporate aspects of steps shown in FIGS. 9 and 10. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 11. Steps may be performed serially, in a partially overlapping manner, or fully in parallel. Thus, the order in which steps of method 1100 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim.

Method 1100 begins with step 1102. In step 1102, a single input image having an illuminated subject is received, in an embodiment.

In step 1104, the input image is relighted using a neural network and a target spherical harmonic lighting embedding to generate a relighted image having the subject of the single input image illuminated based on the target illumination embedding. The neural network includes a first autoencoder trained using a first training set that includes source images and a target illumination embedding, the source images having respective illuminated subjects, the first autoencoder being trained to generate a first output set that includes estimated source illumination embeddings and first reconstructed images that correspond to the source images, the reconstructed images having respective subjects that are i) from the corresponding source image, and ii) illuminated based on the target illumination embedding. The neural network further includes a second autoencoder trained using a second training set that includes augmented images and the target illumination embedding, the augmented images corresponding to the source images, the second autoencoder being trained to generate a second output set that includes estimated augmented illumination embeddings and second reconstructed images that correspond to the augmented images.

The first and second autoencoders generally correspond to instances of the autoencoder 500, for example, ones of the autoencoders 602, 604, 702, and/or 704 using the neural network model 132 after at least some of the training steps described above, in various embodiments. In some embodiments, the single input image corresponds to the image 400 and the relighted image correspond to the image 475.

In some embodiments, the method 1100 further includes receiving a data structure that represents the target spherical harmonic lighting embedding. In an embodiment, for example, the relighting engine 112 receives a data structure that corresponds to an estimated illumination embedding 580 that was previously obtained from an instance of the autoencoder 500 based on a source image. In this embodiment, the data structure may take the form of the data structure 815, for example.

In some embodiments, the method 1100 further includes receiving a reference image and generating a data structure that represents a reference spherical harmonic lighting embedding of the reference image using the neural network. In an embodiment, relighting the source image comprises relighting the source image using the reference spherical harmonic lighting embedding as the target spherical harmonic lighting embedding. In some scenarios, a user selects an image of themselves as the input image and also selects, as the reference image, a desired background, such as an office environment, outdoor environment, or other desired background, into which the user would like to appear. In one such scenario, the user utilizes a video conferencing application to select the input image (e.g., using a webcam) and the desired background, the relighting engine 112 generates the relighted image in real-time or near real-time, and the relighted image is provided to other users of the video conferencing application, giving the user the appearance of being located in a different environment with appropriate directional lighting on their face for that environment. In other scenarios, the reference image is a background image for an augmented reality application or virtual reality application.

Figure 12:
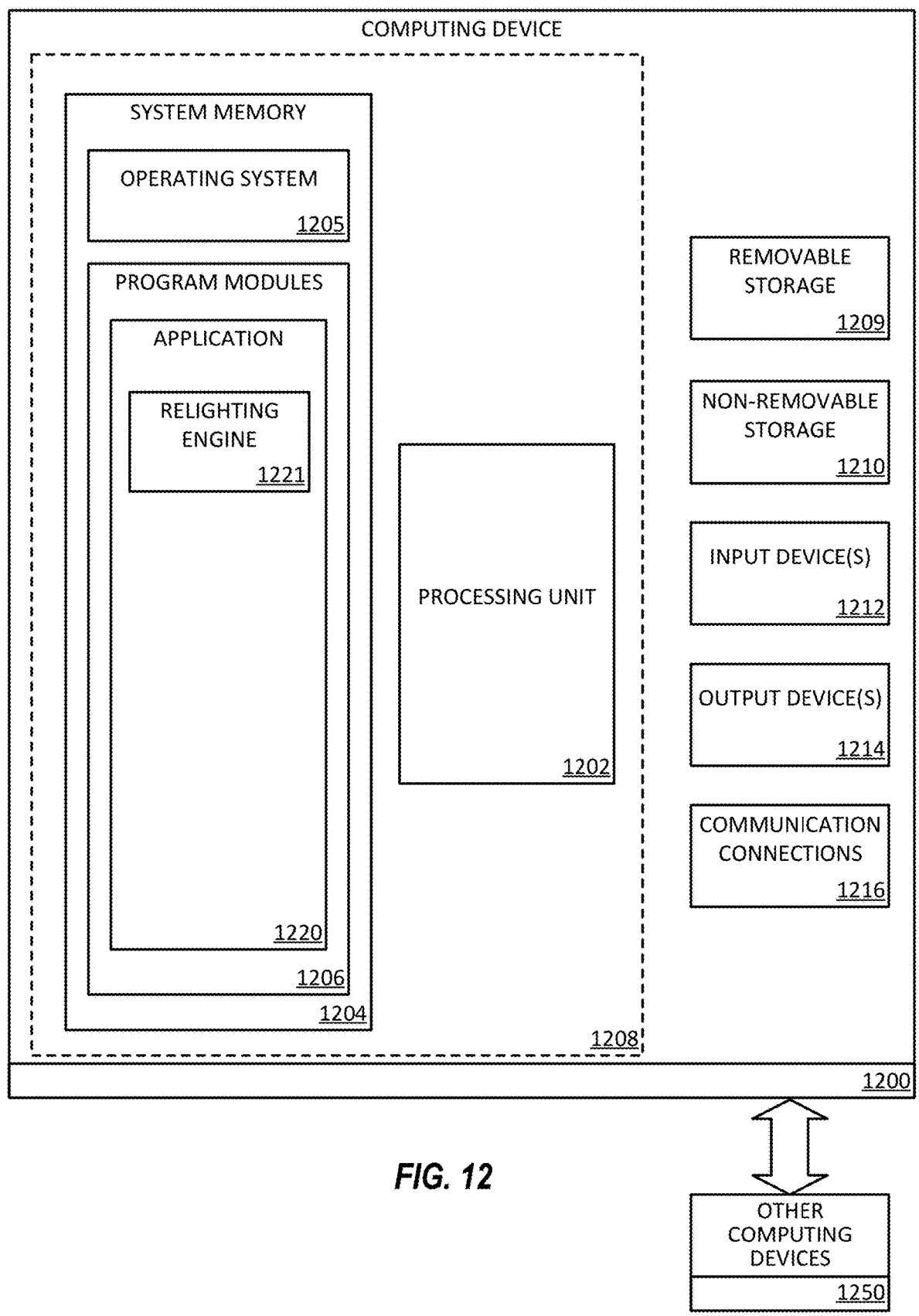
FIG. 12 is a block diagram of an example processor-based computer system that may be used to implement various embodiments of a relighting system.

FIG. 12 and the associated description provides a discussion of a variety of operating environments in which aspects of the disclosure may be practiced. However, the devices and systems illustrated and discussed with respect to FIG. 12 are for purposes of example and illustration and are not limiting of a vast number of computing device configurations that may be utilized for practicing aspects of the disclosure, described herein.

FIG. 12 is a block diagram illustrating physical components (e.g., hardware) of a computing device 1200 with which aspects of the disclosure may be practiced. The computing device components described below may be suitable for the computing and/or processing devices described above. In a basic configuration, the computing device 1200 may include at least one processing unit 1202 and a system memory 1204. Depending on the configuration and type of computing device, the system memory 1204 may comprise, but is not limited to, volatile storage (e.g., random-access memory (RAM)), non-volatile storage (e.g., read-only memory (ROM)), flash memory, or any combination of such memories.

The system memory 1204 may include an operating system 1205 and one or more program modules 1206 suitable for running software application 1220, such as one or more components supported by the systems described herein. As examples, system memory 1204 may include the relighting engine 1221. The relighting engine 1221 may be the same as or similar to the relighting engine 112 and/or relighting engine 122 as previously described. The operating system 1205, for example, may be suitable for controlling the operation of the computing device 1200.

Furthermore, embodiments of the disclosure may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., software applications 1220) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 1200 may also have one or more input device(s) 1212 such as a keyboard, a mouse, a pen, a sound or voice input device, a touch or swipe input device, etc. The one or more input device 1212 may include an image sensor. The output device(s) 1214 such as a display, speakers, a printer, etc. may also be included. The aforementioned devices are examples and others may be used. The computing device 1200 may include one or more communication connections 1216 allowing communications with other computing devices 1250. Examples of suitable communication connections 1216 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 1204, the removable storage device 1209, and the non-removable storage device 1210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method of training a neural network for relighting an image, the method comprising:
   generating a first training set that includes source images and a target illumination embedding, the source images having respective illuminated subjects;
   generating a second training set that includes augmented images and the target illumination embedding, the augmented images corresponding to the source images;
   training a first autoencoder using the first training set to generate a first output set that includes estimated source illumination embeddings and first reconstructed images that correspond to the source images, the first reconstructed images having respective subjects that are i) from the corresponding source image, and ii) illuminated based on the target illumination embedding;
   training a second autoencoder using the second training set to generate a second output set that includes estimated augmented illumination embeddings and second reconstructed images that correspond to the augmented images, wherein the first and second autoencoders have a same structure and shared weights; and
   wherein generating the second training set includes generating the augmented images from the source images by flipping, rotating, or color inverting the corresponding source image.

2. The computer-implemented method of claim 1, wherein a loss function for the training of the first and second autoencoders includes minimizing a difference between the estimated source illumination embedding and the corresponding estimated augmented illumination embeddings.

3. The computer-implemented method of claim 2, wherein:
   the loss function represents the estimated source illumination embedding and the corresponding estimated augmented illumination embeddings using spherical harmonics; and
   minimizing the difference between the estimated source illumination embedding and the corresponding estimated augmented illumination embeddings includes forcing representations of the target illumination embedding, the estimated source illumination embeddings, and the estimated augmented illumination embeddings to be converted to spherical harmonics.

4. The computer-implemented method of claim 2, wherein:
   generating the second training set includes generating an augmented image from a source image by flipping the source image horizontally or vertically; and
   minimizing the difference between the estimated source illumination embedding and the corresponding estimated augmented illumination embedding includes flipping one of the estimated source illumination embedding and the corresponding estimated augmented illumination embedding in a manner similar to the augmented image.

5. The computer-implemented method of claim 2, wherein:
   generating the second training set includes generating an augmented image from a source image by rotating the source image; and
   minimizing the difference between the estimated source illumination embedding and the corresponding estimated augmented illumination embedding includes rotating one of the estimated source illumination embedding and the corresponding estimated augmented illumination embedding in a manner similar to the augmented image.

6. The computer-implemented method of claim 2, wherein:
   generating the second training set includes generating an augmented image from a source image by color inverting the source image; and
   minimizing the difference between the estimated source illumination embedding and the corresponding estimated augmented illumination embedding includes color inverting one of the estimated source illumination embedding and the corresponding estimated augmented illumination embedding in a manner similar to the augmented image.

7. The computer-implemented method of claim 6, wherein generating the augmented image from the source image by color inverting comprises:
   converting the source image from an RGB color space to CIELAB color space to generate the augmented image;
   estimating depth of the augmented image using a pretrained depth prediction model;

separating a subject of the augmented image from a background of the augmented image using the estimated depth;

inverting a perceptual lightness channel of the subject of the augmented image using the estimated depth without inverting the perceptual lightness channel of the background.

8. The computer-implemented method of claim 1, wherein the source images are selected from an unlabeled image dataset.

9. The computer-implemented method of claim 1, the method further comprising:

training a third autoencoder using the first training set to generate a third training set that includes estimated source illumination embeddings and transformed images that correspond to the source images, the transformed images having respective subjects that i) are from the corresponding source image, and ii) illuminated based on the target illumination embedding;

training a fourth autoencoder using the third training set to generate third reconstructed images and reconstructed illumination embeddings, wherein the third and fourth autoencoders have a same structure and shared weights.

10. A computer-implemented method of training a neural network for relighting an image, the method comprising:

generating a first training set that includes source images and a target illumination embedding, the source images having respective illuminated subjects;

training a first autoencoder using the first training set to generate a second training set that includes estimated source illumination embeddings and transformed images that correspond to the source images, the transformed images having respective subjects that i) are from the corresponding source image, and ii) illuminated based on the target illumination embedding;

training a second autoencoder using the second training set to generate reconstructed images and reconstructed illumination embeddings; and self-supervising the training of the first and second autoencoders using the source images and target illumination embedding as ground truths, wherein a loss function for the training of the first and second autoencoders includes i) mean absolute error loss between the source images and reconstructed images, ii) mean absolute error loss between the reconstructed illumination embeddings and the target illumination embedding, and ii) mean absolute loss of image gradient between the source images and reconstructed images.

11. The computer-implemented method of claim 10, wherein the first and second autoencoders have a same structure and shared weights.

12. The computer-implemented method of claim 10, wherein the target illumination embedding is a randomized illumination embedding.

13. The computer-implemented method of claim 10, wherein the source images are selected from an unlabeled image dataset.

14. A computer-implemented method of relighting an input image, the method comprising:

receiving a single input image having an illuminated subject;

relighting the input image using a neural network and a target spherical harmonic lighting embedding to generate a relighted image having the subject of the single input image illuminated based on the target illumination embedding, the neural network having:

a first autoencoder trained using a first training set that includes source images and a target illumination embedding, the source images having respective illuminated subjects, the first autoencoder being trained to generate a first output set that includes estimated source illumination embeddings and first reconstructed images that correspond to the source images, the reconstructed images having respective subjects that are i) from the corresponding source image, and ii) illuminated based on the target illumination embedding, and a second autoencoder trained using a second training set that includes augmented images and the target illumination embedding, the augmented images corresponding to the source images and being generated from the source images by flipping, rotating, or color inverting the corresponding source image, the second autoencoder being trained to generate a second output set that includes estimated augmented illumination embeddings and second reconstructed images that correspond to the augmented images, and the first and second autoencoders having a same structure and shared weights.

15. The computer-implemented method of claim 14, further comprising receiving a data structure that represents the target spherical harmonic lighting embedding.

16. The computer-implemented method of claim 14, further comprising:

receiving a reference image; and generating a data structure that represents a reference spherical harmonic lighting embedding of the reference image using the neural network;

wherein relighting the source image comprises relighting the source image using the reference spherical harmonic lighting embedding as the target spherical harmonic lighting embedding.

* * * * *